(12) United States Patent
Dimitriu et al.

(10) Patent No.: US 8,103,898 B2
(45) Date of Patent: Jan. 24, 2012

(54) EXPLICIT SKEW INTERFACE FOR MITIGATING CROSSTALK AND SIMULTANEOUS SWITCHING NOISE

(75) Inventors: Dragos Dimitriu, Boise, ID (US); Timothy Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 1056 days.

(21) Appl. No.: 11/969,801

(22) Filed: Jan. 4, 2008

(65) Prior Publication Data
US 2009/0174455 A1 Jul. 9, 2009

(51) Int. Cl.
*G06F 1/00* (2006.01)
*H04J 1/12* (2006.01)
*H04J 3/10* (2006.01)
(52) U.S. Cl. ........................ 713/500; 370/201
(58) Field of Classification Search .............. 713/500; 370/201
See application file for complete search history.

(56) References Cited

U.S. PATENT DOCUMENTS

| | | | | |
|---|---|---|---|---|
| 5,594,680 | A * | 1/1997 | Ohtake et al. | 365/63 |
| 5,758,130 | A * | 5/1998 | Dhuey | 713/401 |
| 6,009,532 | A * | 12/1999 | Self et al. | 713/400 |
| 6,211,699 | B1 | 4/2001 | Sudjian | |
| 6,587,907 | B1 * | 7/2003 | Ashby | 710/300 |
| 6,839,856 | B1 * | 1/2005 | Fromm et al. | 713/400 |
| 7,486,702 | B1 * | 2/2009 | Yang | 370/518 |
| 2002/0166101 | A1 * | 11/2002 | Casavant | 716/6 |
| 2008/0117190 | A1 * | 5/2008 | Chen et al. | 345/204 |

FOREIGN PATENT DOCUMENTS
JP 11007349 A * 1/1999

OTHER PUBLICATIONS

Buckwalter et al., "Cancellation of Crosstalk-Induced Jitter," *IEEE Journal of Solid-State Circuits*, vol. 41, No. 3 (Mar. 2006) pp. 621-632.
Deutschmann et al., "Effects of Skewing Output Driver Switching on the Electromagnetic Emission," *IEEE* (2003) pp. 236-241.
Sainarayanan et al., "Minimizing Simultaneous Switching Noise (SSN) Using Modified Odd/Even Bus Invert Method," *Proceedings of the Third IEEE International Workshop on Electronic Design, Test and Applications (DELTA '06)*, (2005), 4 pages.
Senthinathan et al., "Effects of Skewing CMOS Output Driver Switching on the 'Simultaneous' Switching Noise," *IEEE* (1991) pp. 342-345.
Takahashi et al., "Design Practices and Issues for Simultaneous Switching Noise," *IEEE* Electronics Packaging Technology Conference (2005) pp. 820-825.
Tsao et al., "Delay-Difference DLL and Its-Application on skewed Output Buffer," *IEEE* (2002) pp. 279-282.

* cited by examiner

*Primary Examiner* — Mark Connolly
(74) *Attorney, Agent, or Firm* — Knobbe, Martens, Olson & Bear, LLP

(57) ABSTRACT

Methods and apparatus are disclosed, such as those involving an inter-chip interface configured to receive and process electronic data. One such interface includes a receiver circuit that includes a clock tree configured to receive a clock signal at a clock tree input. The clock tree distributes a plurality of clock signals delayed from the clock signal such that one or more of the clock signals have a delay different from the delays of the other clock signals. The receiver circuit further includes a plurality of data input latches configured to receive a plurality of data elements over two or more different points in time. This configuration at least partially reduces crosstalk and simultaneous switching output noise.

6 Claims, 4 Drawing Sheets

EXPLICIT SKEW INTERFACE FOR MITIGATING CROSSTALK AND SIMULTANEOUS SWITCHING NOISE

BACKGROUND OF THE INVENTION

1. Field of the Invention

Embodiments of the invention relate to integrated circuits, and more particularly, in one or more embodiments, to inter-chip interfaces between integrated circuits.

2. Description of the Related Art

In many electronic systems, electronic data is communicated between electronic components. In certain applications, multi-element electronic data is transmitted from one component to another. Such a data transmission may involve transmitting a plurality of signals simultaneously from a transmitting component to a receiving component via parallel channels. The signals may be processed at the receiving component to be compatible with a particular protocol.

When a plurality of signals are simultaneously transmitted between two components, crosstalk and/or simultaneous switching output (SSO) noise can occur due to simultaneous processing of multiple signals within a relatively small space. Crosstalk occurs when energy on one channel induces voltages and/or currents on a neighboring channel through capacitive and/or inductive coupling, respectively. SSO noise occurs when noise is coupled between channels through a power supply network. Depending on the relative timing of transitions on each channel, crosstalk and SSO noise may impact either or both of the magnitude and timing of the signal on the neighboring channel.

As the frequency of data transmission rates increases, crosstalk and SSO noise may further adversely affect the quality of signals, resulting in errors. Thus, there is a need to provide a scheme to reduce or minimize crosstalk and SSO noise in multi-element data transmission.

BRIEF DESCRIPTION OF THE DRAWINGS

The embodiments will be better understood from the Detailed Description of Embodiments and from the appended drawings, which are meant to illustrate and not to limit the embodiments, and wherein.

DETAILED DESCRIPTION OF EMBODIMENTS

As described above, there is a need to provide a multi-element (e.g., multi-bit) data transmission scheme to reduce or eliminate crosstalk and simultaneous switching output (SSO) noise in multi-element data transmission between two components. In addition, there is a need for a scheme that uses relatively low power for use particularly in portable electronic devices, e.g., battery-powered devices. In the context of this document, a component can be a device, integrated circuit (IC), chip, etc.

Figure 1:
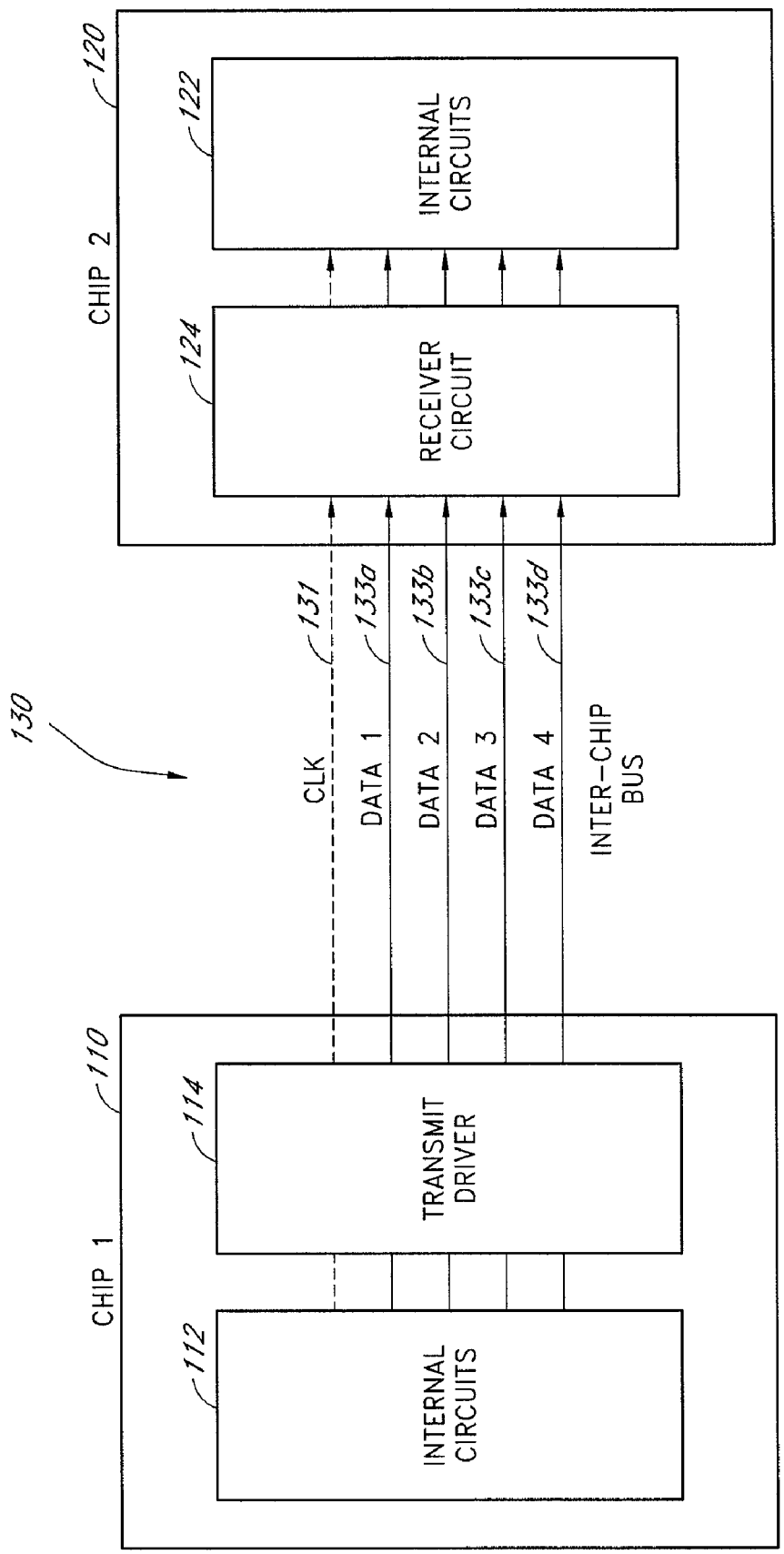
FIG. 1 is a schematic block diagram illustrating a multi-element inter-chip interface between two integrated circuit chips.

A multi-element data transmission scheme according to one embodiment will now be described in connection with FIG. 1. A skilled artisan will, however, appreciate that the scheme may apply to various other contexts. In FIG. 1, multi-element electronic data is transmitted from a first chip 110 to a second chip 120 via an inter-chip bus 130. The electronic data includes a plurality of data groups, each of which includes multiple elements, such as multiple bits. The term "data group" generally refers to a unit of parallel data forming one separate item of information. In one embodiment, the data group may form a word, having 16 elements, or the data group can be one byte wide, having eight elements. The width of the data group is proportional to the inter-chip bus width.

In one embodiment, the first chip 110 may be a processor and the second chip 120 may be a solid state memory (e.g., a random access memory or a flash memory). In another embodiment, the first chip 110 may be a solid state memory and the second chip 120 may be a processor. In yet another embodiment, the first chip 110 may be a solid state memory and the second chip 120 may be another solid state memory. A skilled artisan will appreciate that various other combinations of ICs are also possible.

The first chip 110 includes internal circuits 112 and a transmit driver 114. The internal circuits 112 provide the data to the transmit driver 114. The transmit driver 114 processes and transmits the data to the second chip 120 via the bus 130. In addition, the transmit driver 114 may transmit a clock signal CLK to the second chip 120 via the bus 130.

The second chip 120 includes internal circuits 122 and a receiver circuit 124. The receiver circuit 124 receives the data from the first chip 110 and processes the received data. The receiver circuit 124 transfers the processed data to the internal circuits 122 of the second chip 120. In receiving, processing, and/or transferring the data, the receiver circuit 124 may be at least partially synchronized with one or more internal clock signals delayed from a clock signal CLK.

The inter-chip bus 130 may form a channel, an interconnect, or an interface between the first and second chips 110, 120. The inter-chip bus 130 includes a plurality of parallel lines 131, 133a-133d, depending on the number of the elements of each data group in the data. In the illustrated embodiment, the data is four-element data, and thus the bus 130 includes four data lines 133a-133d. In addition, the exemplary inter-chip bus 130 includes one clock line 131 for carrying the clock signal CLK from the transmit driver 114 to the receiver circuit 124. A skilled artisan will, however, appreciate that the number of lines can vary depending on the bus design, and that the need for a clock signal CLK may be satisfied by extracting the clock signal CLK from the received data within the second chip 120, rather than through the transmission of the clock signal CLK from the first chip 110 to the second chip 120, as is illustrated in the figure.

In the illustrated embodiment, the transmit driver 114 is capable of skewing the launch times of the multiple elements of a data group from line to line. In other words, the transmit driver 114 transmits the elements at different times within a cycle of the data transfer. During the link training between the first and second chips 110 and 120, communication between the chips 110, 120 causes the transmit driver 114 to skew the launch times of the data group to optimize the timing of the received data detection in the receiver circuit 124. As a result, the receive-side clocking may be designed such that by the time the link training is completed, the transmit driver 114 will have pre-skewed elements of the data group in such a way as to provide phase relationships to reduce the impact of SSO noise and crosstalk. The receiver circuit 124 receives and processes the pre-skewed multiple elements at different times, and transfers them to the internal circuits 122. The receiver circuit 124 delays the clock signal CLK to generate multiple delayed internal clock signals, and uses the internal clock signals for timing the receiving, processing, and/or transferring of the pre-skewed elements.

When the transmit driver 114 transmits multiple elements at different times, SSO noise that would otherwise occur in the transmit driver 114 can be significantly reduced, thereby minimizing the degradation of data at the point of transmission. This pre-skewing scheme can also minimize a data transmission error associated with the inter-chip bus 130. Typically, any degradation experienced at the transmit driver 114 is exaggerated by the response of a chip-to-chip channel, e.g., the inter-chip bus 130. As described above, the receiver circuit 124 receives, processes, and/or transfers multiple elements at different times. Thus, crosstalk and SSO noise at the receiver circuit 124 due to simultaneous data processing can also be significantly reduced.

Such reduction in crosstalk and SSO noise makes the data transmission more reliable, particularly when using a relatively high frequency (e.g. above 1 Gigabit/second (Gb/s)) data transmission rate. In addition, the timing margin enhancement provided by such a configuration may allow the chips 110, 120 to use a smaller voltage swing (magnitude) in the data transmission, thereby reducing power consumption.

Progressive Pre-Skewing Interface Scheme

In one embodiment, a first chip transmits a multi-element data group to a second chip along with a clock signal CLK via an inter-chip bus. The first chip may pre-skew the data elements such that the data elements are transmitted at an interval while being delayed one from another. The second chip includes a receiver circuit to receive and process the pre-skewed elements of the data group.

The receiver circuit includes a linear clock tree, an input latch block, and a group latch block. The plurality of data elements are received at the input latch block at least partially in response to clock signals, each delayed by the linear clock tree from the clock signal from the first chip. The data elements are then transferred to the group latch block via data paths.

Delays in the data elements on the data paths match delays in the clock signals on the linear clock tree. Thus, all the data elements arrive essentially simultaneously at the group latch block. This configuration is suitable for high-speed packet-based communications, where the data elements are typically brought together and subjected to various element manipulation such as error correction coding (ECC). In addition, the linear clock tree uses relatively less routing and power than a typical clock tree, and because adjacent elements are pre-skewed, crosstalk and SSO effects are significantly reduced.

Figure 2:
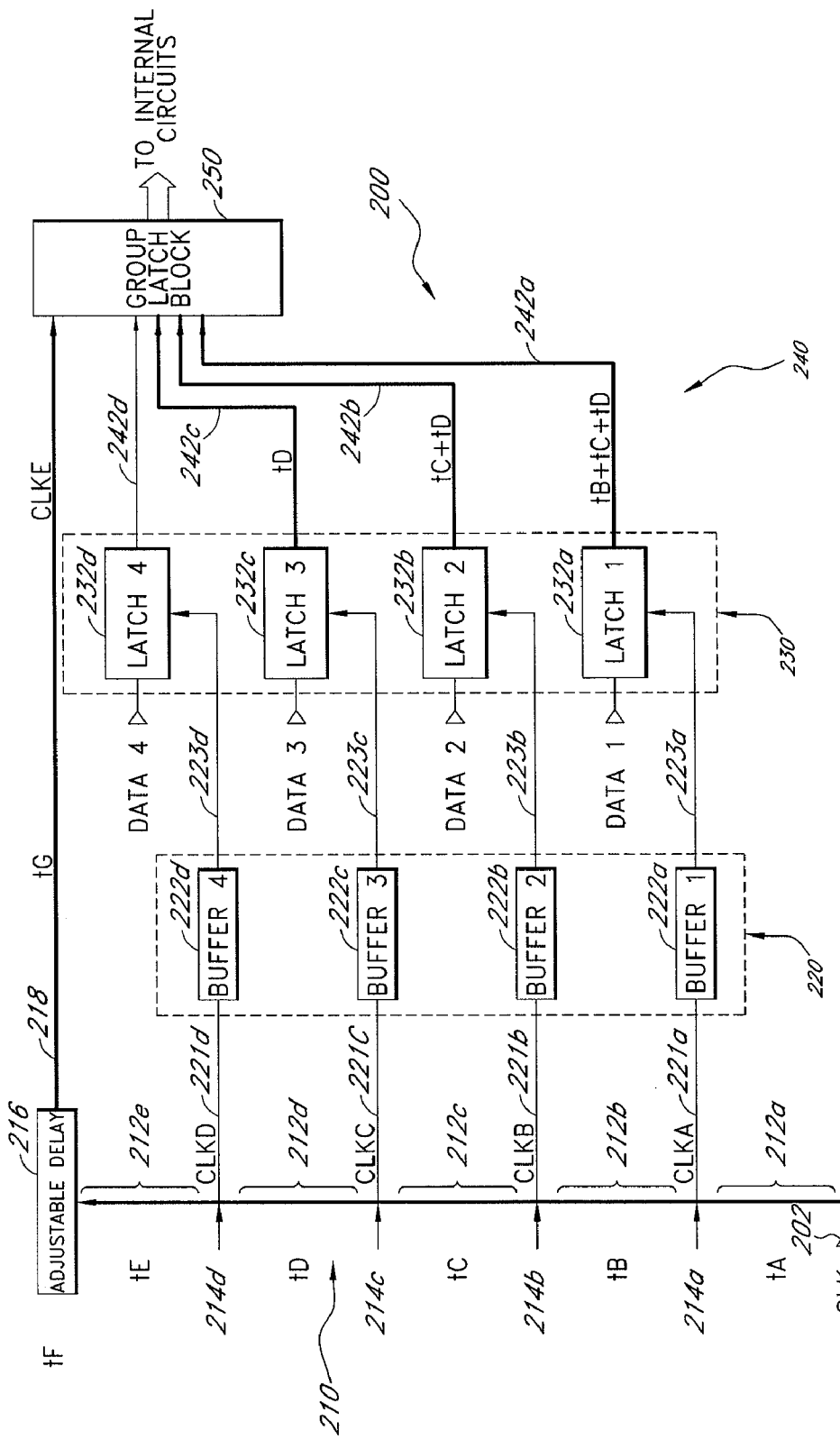
FIG. 2 is a schematic block diagram illustrating one embodiment of an IC receiver circuit which uses a progressive pre-skewing scheme.

FIG. 2 illustrates one embodiment of a receiver circuit 200 that can be used in an integrated circuit for receiving multi-element data, for example, in the context of FIG. 1. In the illustrated embodiment, the receiver circuit 200 includes a clock input and receiver 202, a linear clock tree 210, an adjustable delay 216, a clock line 218, a distributed clock buffer block 220, a distributed input latch block 230, a data path 240, and a group latch block 250. The clock buffer block 220 and the input latch block 230 are distributed in the sense that each component of either block is placed in close proximity to the corresponding data input. In FIG. 2, a thickly-drawn line indicates a relatively long line that can generate a relatively large delay in a signal while a thinly-drawn line indicates a relatively short line that generates essentially little or no delay in a signal.

The linear clock tree 210 includes a line extending from the clock input and receiver 202 to the adjustable delay 216. The linear clock tree 210 is configured to propagate a clock signal received at the clock input 202. The illustrated linear clock tree 210 includes first to fourth clock nodes 214a-214d positioned in order along the line. The clock tree 210 also includes first to fifth segments 212a-212e partitioned by the clock nodes 214a-214d. In certain embodiments, the clock tree 210 may also include buffers at at least one of the nodes 214a-214d to maintain signal strength. The linear clock tree 210 is relatively simple and uses less power compared to a typical clock tree.

Each of the segments 212a-212e of the linear clock tree 210 is defined as a portion between two of the following: the clock input 202, first to fourth clock nodes 214a-214d, and the adjustable delay 216. Each of the segments 212a-212e is sufficiently long such that a signal traveling along the segment experiences a delay. The first segment 212a is defined between the clock input 202 and the first clock node 214a, and provides a time delay tA. The second segment 212b is defined between the first clock node 214a and the second clock node 214b, and provides a time delay tB. The third segment 212c is defined between the second clock node 214b and the third clock node 214c, and provides a time delay tC. The fourth segment 212d is defined between the third clock node 214c and the fourth clock node 214d, and provides a time delay tD. The fifth segment 212e is defined between the fourth clock node 214d and the adjustable delay 216, and generates a time delay tE. In one embodiment, the time delays tA, tB, tC, tD, tE can be essentially the same as one another. In other embodiments, at least one of the time delays tA, tB, tC, tD, tE can be different from the other time delays. In the illustrated embodiment, the segments 212a-212e provide fixed delays. For example, a line having a length of about 500 µm to about 600 µm may delay a signal by about 80 ps to about 90 ps.

The adjustable delay 216 receives a clock signal which has traveled along the first to fifth segments 212a-212e of the clock tree 210, and may further delay the signal by a time delay tF, which is adjustable. In addition, the clock line 218 is sufficiently long that the clock signal experiences a time delay tG while traveling therethrough. The adjustable delay 216 may adjust a total clock signal delay between the fourth node 214d and the group latch block 250 by controlling the amount of the delay tF. The adjustable delay 216 serves to time the group latch block 250.

The distributed clock buffer block 220 includes first to fourth clock buffers 222a-222d. In one embodiment, each of the buffers 222a-222d includes a current mode logic (CML) to complementary metal oxide semiconductor (CMOS) converter, and inverters. The CML-to-CMOS converter serves to convert a signal suitable for current mode logic into a signal suitable for CMOS logic. A typical CML circuit operates with a differential swing of two to three hundred millivolts while a typical CMOS circuit operates with a single ended voltage within a specified voltage range (e.g., 2.5 to 3.0V for logic high; 0 to 0.5V for logic low). The inverters serve to sharpen the edges of the output signals from the CML-to-CMOS converter and provide the signals to the members of the distributed input latch block 230. The clock buffers 222a-222d are matched and add essentially the same delay to each of the clock signals on lines 221a-221d. The relative delays of clock signals on lines 223a-223d are essentially the same as those on lines 221a-221d.

Each of the first to fourth buffers 222a-222d receives a respective one of first to fourth clock signals CLKA, CLKB, CLKC, CLKD from a respective one of the first to fourth clock nodes 214a-214d. Each of the first to fourth clock signals CLKA-CLKD has essentially the same frequency as those of the external clock signal CLK, but is delayed from the external clock signal CLK.

In the illustrated embodiment, lines 221a-221d connecting the linear clock tree 210 to the buffers 222a-222d are relatively short, causing no substantial delay. Thus, the first clock buffer 222a receives the first clock signal CLKA with a delay tA with reference to the external clock signal CLK, received at the clock input 202. The second buffer 222b receives the second clock signal CLKB with a delay tA+tB with reference to the external clock CLK. The third buffer 222c receives the third clock signal CLKC with a delay tA+tB+tC with reference to the external clock signal CLK. The fourth buffer 222d receives the fourth clock signal CLKD with a delay tA+tB+tC+tD with reference to the external clock signal CLK.

In the illustrated embodiment, lines 223a-223d connecting the buffers 222a-222d to the input latch block 230 are relatively short, causing no substantial delay. Thus, the clock signals CLKA-CLKD arrive at the members of the distributed input latch block 230 with relative delays essentially the same as the delays associated with the clock tree 210.

The distributed input latch block 230 includes first to fourth input latches 232a-232d arranged in parallel to one another. In one embodiment, each of the input latches 232a-232d includes one or more sense amplifier latches followed by RS latches and inverters at the outputs of the RS latches. The sense-amplifier latches permit detection of small incoming signal amplitudes with accuracy. In the illustrated embodiment, the receiver circuit 200 uses multi-phase or fractional-rate clocking. In other words, each of the input latches 232a-232d may include two or four latch groups, and each clock path may carry multiple clocks to each set of the latch groups. For example, in FIG. 2, there are four clock signals sent to the four input latches 232a-232d. Each of these four clock signals may be further divided into two or four clock signals to trigger the two or four latch groups. Such a scheme is generally referred to as multi-phase clocking (which is also referred to as fractional-rate clocking). In an embodiment where each of the clock signals is divided into two clock signals, the resulting clock rate is one half (½) of the data rate and such a clock signal is referred to as a half-rate clock. In another embodiment where each of the clock signals is divided into four clock signals, the clock rate is one quarter (¼) of the data rate and such a clock signal is referred to as a quarter-rate clock. In addition to dividing the clock down to a set of parallel clocks at lower frequencies, the phase relationship between the fractional-rate clocks must be set to insure that a clock edge is available to capture each incoming data element, hence the name multi-phase clocking. A skilled artisan will appreciate that various configurations of the latches can be used for the latches 232a-232d.

The first to fourth input latches 232a-232d receive delayed clock signals from the first to fourth buffers 222a-222d, respectively. The first to fourth input latches 232a-232d also receive first to fourth data elements DATA1-DATA4 from the first chip via the inter-chip bus. In receiving the data elements DATA1-DATA4, the input latches 232a-232d operate at least partially in synchronization with the clock signals CLKA-CLKD.

The data path 240 includes first to fourth data lines 242a-242d, each of which connects a respective one of the input latches 232a-232d to the group latch block 250. In the illustrated embodiment, the first to third data lines 242a-242c are sufficiently long that a signal traveling therethrough experiences a delay. The first data line 242a has a length that causes a signal delay of about tB+tC+tD. The second data line 242b has a length that causes a signal delay of about tC+tD. The third data line 242c has a length that causes a signal delay of about tD. On the other hand, the fourth data line 242d has a length that causes no substantial delay.

The configurations of the clock tree 210 and the first to fourth data lines 242a-242d permit the data elements DATA1-DATA4 to arrive at the group latch block 250 at essentially the same time. The first data element DATA1 arrives at the group latch block 250 with a total delay of tA+tB+tC+tD and delays associated with the first buffer 222a and the first input latch 232a because the first input latch 232a outputs the first data element DATA1 upon receiving the first clock signal CLKA with a delay of tA and the first data element DATA1 experiences a delay of tB+tC+tD while traveling through the first data line 242a. Similarly, the second data element DATA2 arrives at the group latch block 250 with a total delay of tA+tB+tC+tD and delays associated with the second buffer 222b and the second input latch 232b because the second input latch 232b outputs the second data element DATA2 upon receiving the second clock signal CLKB with a delay of tA+tB and the second data element DATA2 experiences a delay of tC+tD while traveling through the second data line 242b. The third data element DATA3 arrives at the group latch block 250 with a total delay of tA+tB+tC+tD and delays associated with the third buffer 222c and the third input latch 232c, because the third input latch 232c outputs the third data element DATA3 upon receiving the third clock signal CLKC with a delay of tA+tB+tC and the third data element DATA3 experiences a delay of tD while traveling through the third data line 242c. The fourth data element DATA4 arrives at the group latch block 250 with a total delay of tA+tB+tC+tD and delays associated with the fourth buffer 222d and the fourth input latch 232d, because the fourth input latch 232c outputs the fourth data element DATA4 upon receiving the fourth clock signal CLKD with a delay of tA+tB+tC+tD and the fourth data element DATA4 experiences no substantial delay while traveling through the third data line 242c.

The group latch block 250 receives the data elements from the input latches 232a-232d via the data lines 242a-242d. The group latch block 250 can include a plurality of latches, each of which is configured to receive and store at least one of the data elements DATA1-DATA4. The group latch block 250 may operate in synchronization with a fifth clock signal CLKE which is delayed by tA+tB+tC+tD+tE+tF+tG from the external clock signal CLK. In synchronization with the fifth clock signal CLKE, the group latch block 250 may provide the data elements to internal circuits of the IC.

Interleaved Pre-Skew Interface

In another embodiment, a first chip transmits multi-element data to a second chip along with a clock signal via an inter-chip bus. The first chip may pre-skew the data such that some (e.g., data elements on odd-numbered lines DATA1, DATA3 in the context of FIG. 1) of the data elements are transmitted at one point in time and the other data elements (e.g., elements on even-numbered lines DATA2, DATA4 in the context of FIG. 1) are transmitted at another point in time. The second chip may include a receiver circuit. The receiver circuit of the second chip may include a clock tree, an input latch block, and a group latch block. The data elements are received at the input latches in synchronization with clock signals delayed by the clock tree from the clock signal from the first chip. The data elements are then transferred to the group latch block via a data path. By adjusting the timing of receiving, processing, and/or transferring the data elements, crosstalk and SSO effects can be significantly reduced.

Figure 3:
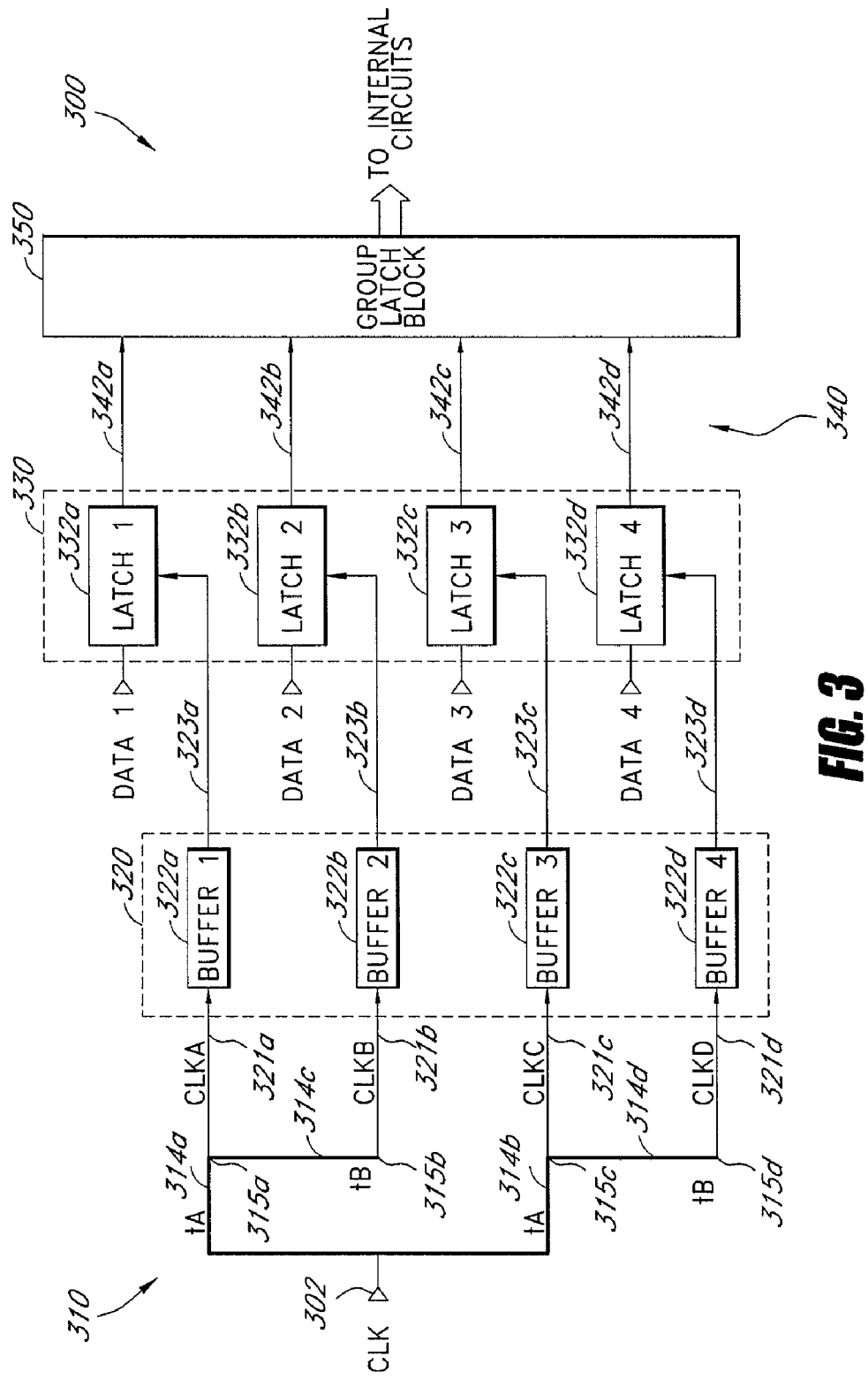
FIG. 3 is a schematic block diagram illustrating another embodiment of an IC receiver circuit which uses an interleaved pre-skewing scheme.

Referring to FIG. 3, another embodiment of a receiver circuit 300 that can be used in an integrated circuit receiving a multi-element data group (e.g., the second chip 120 of FIG. 1) will now be described. In the illustrated embodiment, the receiver circuit 300 includes a clock input 302, a clock tree 310, a distributed clock buffer 320, a distributed input latch block 330, a data path 340, and a group latch block 350, where the distributed nature of the clock buffer 320 and the input latch block 330 were identified in the previous embodiment. In FIG. 3, a thickly-drawn line indicates a relatively long line that can cause a delay in a signal while a thinly-drawn line indicates a relatively short line that causes no substantial delay in a signal.

The illustrated clock tree 310 includes first and second lines 314a, 314b of essentially the same length and third and fourth lines 314c, 314d of essentially the same length. Each of the first and second lines 314a, 314b extends from the clock input 302 to a respective one of the third and fourth lines 314c, 314d. In the illustrated embodiment, the first to fourth lines 314a-314d are sufficiently long such that a clock signal traveling therethrough experiences a delay. For example, a line having a length of about 500 µm to about 600 µm delays a signal by about 80 ps to about 90 ps. The first and second lines 314a, 314b delay a clock signal by tA. The third and fourth lines 314c, 314d delay a clock signal by tB.

The distributed clock buffer 320 includes first to fourth buffers 322a-322d. In one embodiment, each of the buffer 322a-322d includes a CML-to-CMOS converter, and inverters. The configurations of the CML-to-CMOS converter and inverters can be as described above with respect to those of the CML-to-CMOS converter and inverters of the buffers 222a-222d of FIG. 2. The first buffer 322a receives a first clock signal CLKA from a first node 315a where the first and third lines 314a, 314c meet. The second buffer 322b receives a second clock signal CLKB from a second node 315b, which is positioned at the end of the third line 314c opposite from first node 315a. The third buffer 322c receives a third clock signal CLKC from a third node 315c where the second and fourth lines 314b, 314d meet. The fourth buffer 322d receives a fourth clock signal CLKB from a fourth node 315d which is positioned at the end of the fourth line 314d opposite from third node 315d. Each of the first to fourth clock signals CLKA-CLKD has the same frequency as the first chip's clock signal CLK (external clock signal), but has a delay from the first chip's clock signal CLK.

In the illustrated embodiment, lines 321a-321d connecting the clock tree 310 to the buffers 322a-322d are relatively short, causing no substantial delay. Because the first and second lines 314a, 314b are of essentially the same length, the first and third buffers 322a, 322c receive the clock signals CLKA, CLKC with essentially the same delay. In the illustrated embodiment, the first buffer 322a receives the first clock signal CLKA with a delay tA with reference to the external clock signal CLK. The third buffer 322c receives the third clock signal CLKC with the same delay tA with reference to the external clock signal CLK.

Because the third and fourth lines 314c, 314d are of essentially the same length, and are connected to the corresponding points of the first and second lines 314a, 314b, respectively, the second and fourth buffers 322b, 322d receive the clock signals CLKB, CLKD with essentially the same delay. The second buffer 322b receives the second clock signal CLKB with a delay tA+tB with reference to the external clock signal CLK. Similarly, the fourth buffer 322d receives the fourth clock signal CLKD with the same delay tA+tB with reference to the external clock signal CLK.

In the illustrated embodiment, lines 323a-323d connecting the clock buffers 322a-322d to the distributed input latch block 330 are relatively short, causing no substantial delay. Thus, the clock signals arrive at the distributed input latch block 230 with the delays associated only with the clock tree 310 and the buffers 332a-332d.

The input latch block 330 includes first to fourth latches 332a-332d arranged in parallel to one another. In one embodiment, each of the latches 332a-332d includes one or more parallel sense amplifiers followed by RS latches and one or more inverters at the output of the RS latches. As discussed previously, each clock signal provided to the latches by the clock tree may actually consist of a plurality of fractional-rate, phase-shifted clock signals. A skilled artisan will appreciate that various configurations of the latches can be used for the latches 332a-332d. The first to fourth latches 332a-332d receive delayed clock signals CLKA-CLKD from the first to fourth buffers 322a-322d, respectively. The first to fourth latches 332a-332d also receive first to fourth data elements DATA1-DATA4 from the first chip via the inter-chip bus.

In the illustrated embodiment, the first and third latches 332a, 332c receive data elements DATA1, DATA3 at one point in time while the second and fourth latches 332b, 332d receive data elements DATA2, DATA4 at another point in time. The input latches 332a-332d may operate at least partially in synchronization with the delayed clock signals CLKA-CLKD from the clock buffers 322a-322d. In one embodiment, a difference in delay between the first/third clock signals and second/fourth clock signals is about a half (½) of a unit interval (the duration of a data element). In other embodiments, data being transferred may be more than 4 elements. In such embodiments, even-numbered latches receive data elements at one point in time while odd-numbered latches receive data elements at another point in time.

The data path 340 includes first to fourth data lines 342a-342d, each of which connects a respective one of the input latches 332a-332d to the group latch block 350. In the illustrated embodiment, the first to fourth data lines 342a-342d are relatively short such that a signal traveling therethrough experiences no substantial delay.

The illustrated configuration permits the first and third data elements DATA1, DATA3 to arrive at the group latch block 350 at essentially the same time. The first data element DATA1 arrives at the group latch block 350 with a total delay of tA and delays associated with the first buffer 322a and the first latch 332a. The third data element DATA3 arrives at the group latch block 350 with a total delay of tA and delays associated with the third buffer 322c and the third latch 332c. Because the delays associated with the buffers and latches can be essentially the same as each other, the first and third data elements DATA1, DATA3 arrive at the group latch block 350 at essentially the same time.

Similarly, the illustrated configuration permits the second and fourth data elements DATA2, DATA4 to arrive at the group latch block 350 at essentially the same time. The second data element DATA2 arrives at the group latch block 350 with a total delay of tA+tB and delays associated with the second buffer 322b and the second latch 332b. The fourth data element DATA4 arrives at the group latch block 350 with a total delay of tA+tB and delays associated with the fourth buffer 322d and the fourth latch 332d. Because the delays associated with the buffers and latches can be essentially the same as each other, the second and fourth data elements DATA2, DATA4 arrive at the group latch block 350 at essentially the same time.

The group latch block 350 receives the data elements from the latches 332a-332d via the data path 340. The group latch block 350 can include a plurality of latches, each of which is configured to receive and store a respective one of the data elements. The group latch block 350 may operate in synchronization with a fifth clock signal (not shown) delayed from the external clock signal CLK. In accordance with the fifth clock signal, the group latch block 250 may provide the data elements to internal circuits of the IC.

Figure 4:
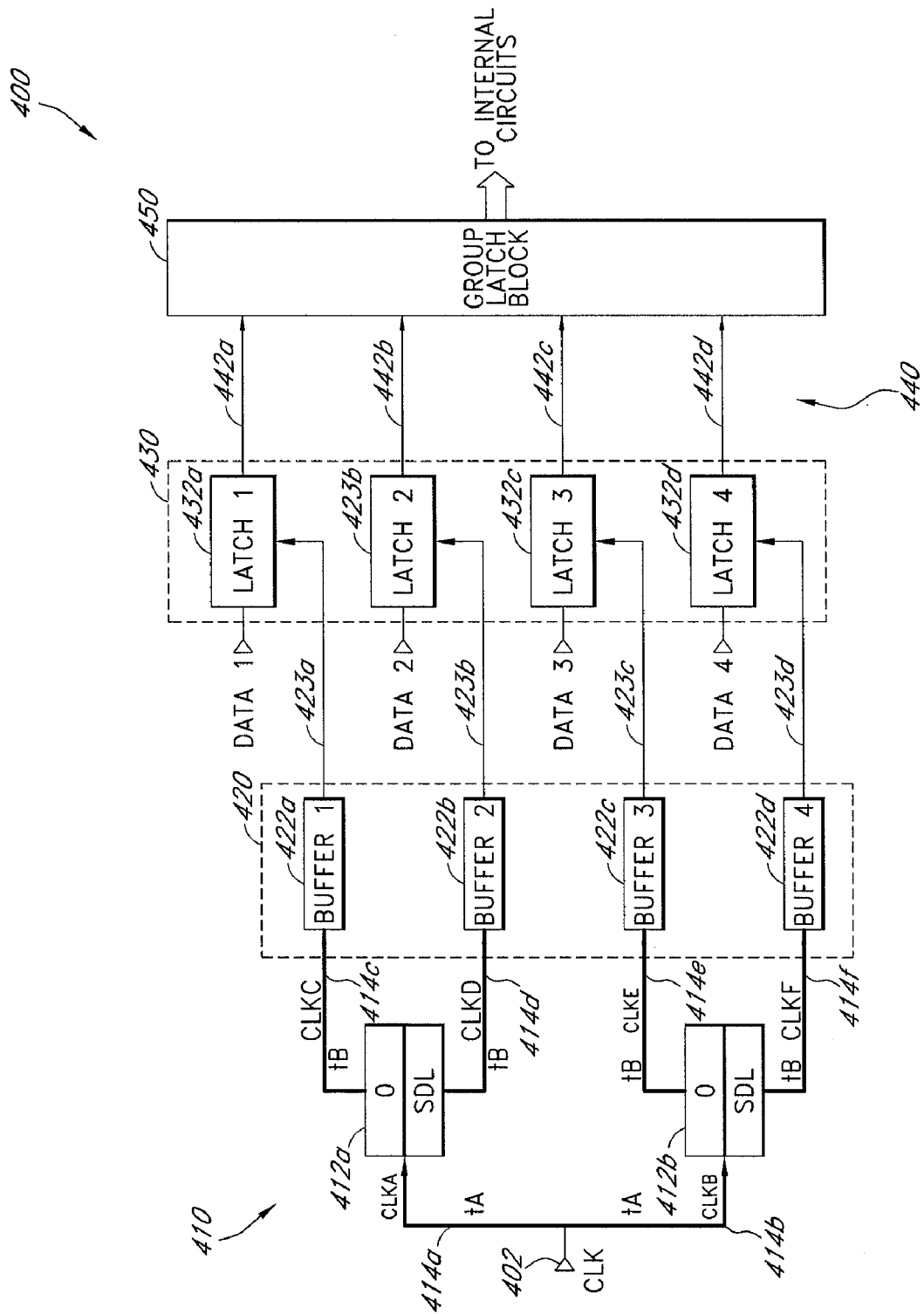
FIG. 4 is a schematic block diagram illustrating yet another embodiment of an IC receiver circuit which uses an interleaved pre-skewing scheme.

Referring to FIG. 4, another embodiment of a receiver circuit 400 that can be used in an integrated circuit receiving a multi-element data group (e.g., the second chip 120 of FIG. 1) will now be described. In the illustrated embodiment, the receiver circuit 400 includes a clock input 402, a clock tree 410, a distributed clock buffer 420, a distributed input latch block 430, a data path 440, and a group latch block 450. In FIG. 4, a thickly-dawn line indicates a relatively long line that can cause a delay in a signal while a thinly-drawn line indicates a relatively short line that causes no substantial delay in a signal.

The illustrated clock tree 410 includes first and second lines 414a, 414b. The clock tree 410 further includes at least one slave delay line (SDL). In one embodiment, the clock tree may include a single SDL with multiple taps. In other embodiments, the clock tree may include two or more SDLs. The illustrated clock tree 410 includes first and second slave delay lines (SDL) 412a, 412b, and fourth to sixth lines 414c-414f. The first and second lines 414a, 414b are of essentially the same length, and extend from the clock input 402 to the first and second SDLs 412a, 412b, respectively. The third and fourth lines 414c, 414d are of essentially the same length and extend from the first SDL 412a. The fifth and sixth lines 414e, 414f are of essentially the same length and extend from the second SDL 412b. In the illustrated embodiment, all of the first to sixth lines 414a-414f are denoted as relatively long lines. In other embodiments, at least some of the lines 414a-414f can be relatively short lines as long as the lengths of the lines are essentially the same as each other as described above.

Each of the SDLs 412a, 412b provides two clock signals having different phases. Each of the SDLs 412a, 412b can include a delay line having a plurality of delay stages from which signals can be extracted. In one embodiment, the SDLs 412a, 412b may be part of, or controlled by, a phase locked loop (PLL) or a delay locked loop (DLL). One of the two clock signals may have the same phase or delay as that of a clock signal arriving at the SDL. The other of the two clock signals may have a phase or delay difference from that of the clock signal arriving at the SDL. In other embodiments, one of the two clock signals may have a first phase difference from the phase of the clock signal arriving at the SDL while the other clock signal may have a second phase which is different from the first phase and the phase of the clock signal arriving at the SDL.

In one embodiment, the first SDL 412a provides the third line 414c with a clock signal having 0° phase difference from a clock signal arriving at the first SDL 412a while providing the fourth line 414d with a clock signal having 45° phase difference from the clock signal arriving at the first SDL 412a. The phase differences in this embodiment are based on a multi-phase clocking scheme, using, for example, quarter-rate clocks. The second SDL 412b provides the fifth line 414e with a clock signal having 0° phase difference from a clock signal arriving at the second SDL 412b while providing the sixth line 414f with a clock signal having 45° phase difference from the clock signal arriving at the second SDL 412b.

In another embodiment, the first SDL 412a provides the third line 414c with a clock signal having 0° phase difference from clock a signal arriving at the first SDL 412a while providing the fourth line 414d with a clock signal having a phase difference between about 0° and about 90° from the clock signal arriving at the first SDL 412a. The phase differences in this embodiment are based on a multi-phase clocking scheme, using, for example, quarter-rate clocks. The second SDL 412b provides the fifth line 414e with a clock signal having 0° phase difference from a clock signal arriving at the second SDL 412b while providing the sixth line 414f with a clock signal having a phase difference between about 0° and about 90° from the clock signal arriving at the second SDL 412b. This scheme may need link training between the first and second chips during an initialization process for data transmission. The link training may be conducted in a manner to sweep the phase mismatch to locate an optimal phase difference. This configuration allows the receiver circuit 400 to adjust the phase difference for an optimal skew between data signals.

In the illustrated embodiment, the first to sixth lines 414a-414f are sufficiently long such that a clock signal traveling therethrough experiences a delay. The first and second lines 414a, 414b delay a clock signal by tA. The third to sixth lines 414c-414f delay a clock signal by tB.

The distributed clock buffer 420 includes first to fourth clock buffers 422a-422d. In one embodiment, each of the buffer 422a-422d includes a CML-to-CMOS converter, and inverters. The configurations of the CML-to-CMOS converter and inverters can be as described above with respect to those of the CML-to-CMOS converter and inverters of the buffers 222a-222d of FIG. 2. Each of the first, second, third, and fourth buffers 422a receives a respective one of third to sixth clock signals CLKC, CLKD, CLKE, CLKF from the clock tree 410. Each of the third to sixth clock signals CLKC-CLKF has essentially the same frequency as the external clock signal CLK, but has a delay from the external clock signal CLK.

In the illustrated embodiment, each of the first and second lines 414a, 414b of the clock tree 410 delays the external clock signal CLK by tA. Because the first and second lines 414a, 414b are of essentially the same length, the first and second SDLs 412a, 412b receive clock signals CLKA, CLKB having essentially the same delay tA. The first and second SDLs 412a, 412b provide the third and fifth lines 414c, 414e with signals having essentially the same phase or delay with respect to the clock signals CLKA, CLKB. In addition, the third and fifth lines 414c, 414e are of essentially the same length, and cause essentially the same delay tB. Thus, the third clock signal CLKC and the fifth clock signal CLKE reach the first buffer 422a and the third buffer 422c, respectively, at essentially the same time.

Similarly, the first and second SDLs 412a, 412b provides the fourth and sixth lines 414d, 414f with signals having essentially the same phase or delay with respect to the clock signals CLKA, CLKB. In addition, the fourth and sixth lines 414d, 414f are of essentially the same length, and cause essentially the same delay tB. Thus, the fourth clock signal CLKD and the sixth clock signal CLKF reach the second buffer 422b and the fourth buffer 422d, respectively, at essentially the same time, while being phase-shifted from the clock signals CLKC, CLKE.

In the illustrated embodiment, lines connecting the buffers 422a-422d to the input latch block 430 are relatively short, causing no substantial delay. Thus, the clock signals arrive at the input latch block 430 with delays essentially the same as the delays associated with the clock tree 410, the SDLs 412a, 412b, and the third to sixth lines 414c-414f.

The distributed input latch block 430 includes first to fourth latches 432a-432d arranged in parallel to one another. In one embodiment, each of the latches 432a-432d includes one or more sense amplifiers followed by RS latches and one or more inverters at the output of the RS latches. Again, this embodiment may be compatible with fractional-rate, multi-phase clocking schemes. A skilled artisan will appreciate that various configurations of the latches can be used for the latches 432a-432d. The first to fourth latches 432a-432d receives first to fourth data elements DATA1, DATA2, DATA3, DATA4 from the first chip via the inter-chip bus. The first to fourth latches 432a-432d also receive delayed clock signals from the first to fourth buffers 422a-422d, respectively.

The input latches 432a-432d operate at least partially in synchronization with the delayed clock signals from the buffers 422a-422d. The first and third latches 432a, 432c receive data elements at one point in time while the second and fourth latches 432b, 432d receive data elements at another point in time. In one embodiment, a difference in delay between the first/third clock signals and second/fourth clock signals is a half (½) of unit interval (the duration of a data element), or 45 degrees relative to a quarter-rate clock. In certain embodiments, data being transferred may be more than 4 elements. In such embodiments, even-numbered latches receive data elements at one point in time while odd-numbered latches receive data elements at another point in time.

The data path 440 includes first to fourth lines 442a-442d, each of which connects a respective one of the latches 432a-432d to the group latch block 450. In the illustrated embodiment, the first to third lines 442a-442c are relatively short such that a signal traveling therethrough experiences no substantial delay.

The illustrated configuration permits the first and third data elements DATA1, DATA3 to reach the group latch block 450 at essentially the same time. The first data element DATA1 arrives at the group latch block 450 with a total delay of tA+tB plus one of two phase shifts introduced by the first SDL 412a, and delays associated with the first buffer 422a and the first latch 432a. The third data element DATA3 arrives at the group latch block 450 with a total delay of tA+tB plus one of two phase shifts introduced by the second SDL 412b, and delays associated with the third buffer 422c and the third latch 432c. Because the delays associated with the SDLs, the buffers, and latches can be essentially the same as each other, the first and third data elements DATA1, DATA3 reach the group latch block 450 at essentially the same time.

Similarly, the illustrated configuration permits the second and fourth data elements DATA2, DATA4 to reach the group latch block 450 at essentially the same time. The second data element DATA2 arrives at the group latch block 450 with a total delay of tA+tB plus the other of the two phase shifts introduced by the first SDL 412a and delays associated with the second buffer 422b and the second latch 432b. The fourth data element DATA4 arrives at the group latch block 350 with a total delay of tA+tB plus the other of the two phase shifts introduced by the second SDL 412b, and delays associated with the fourth buffer 422d and the fourth latch 432d. Because the delays associated with the SDLs, the buffers, and latches are essentially the same as each other, the second and fourth data elements DATA2, DATA4 arrive at the group latch block 450 at essentially the same time.

The group latch block 450 receives the data elements DATA1-DATA4 from the latches 432a-432d via the data path 440. The group latch block 450 may operate in synchronization with a fifth clock signal (not shown) delayed from the external clock signal CLK. In accordance with the fifth clock signal, the group latch block 450 may provide the data elements to internal circuits of the IC.

When the schemes described above were simulated to provide data eye graphs, they extended the data eye graph width by ⅛ unit internal (UT) with data eye height reduction. This data eye height reduction can be mitigated, to a degree, through the simultaneous implementation of an appropriate data bus inversion (DBI) scheme.

In another embodiment, the pre-skewing schemes described above can be used in a system using clock data recovery (CDR). In such a system, a first chip (transmitter) transmits data to a second chip (receiver) without providing a clock signal. The second chip extracts a clock from the data transmitted from the first chip, and may use the clock for timing its processes in performing one of the schemes described above.

In one embodiment, a clock signal may be extracted from a data group included in the data from the first chip. The clock signal may be distributed using any one of the schemes described above for data capturing. Deciding from which component of the data group to extract the clock signal may depend on the pre-skewing schemes. In certain embodiments, a clock signal may be extracted from more than one component of a data group. In an embodiment using the progressive pre-skewing scheme, a clock signal may be extracted from one end of a data group. In another embodiment using the interleaved pre-skewing scheme, a clock signal may be extracted from the center of a data group. Components of a data group that are not used for clock extraction may be loaded with dummy loads to mimic the loading of the clock extraction circuitry.

In the embodiments described above, the pre-skewing schemes described above reduce crosstalk and SSO noise that would otherwise occur in the transmitter and the receiver, thereby permitting enhanced signal timing margin. In at least some of the embodiments, the receiver clock tree consumes relatively less power. These configurations provide reliable and accurate data transmission between ICs, particularly at a relatively high data transmission rate.

The receiver circuits of the embodiments described above can apply to various electronic devices. Examples of the electronic devices can include, but are not limited to, consumer electronic products, electronic circuits, electronic circuit components, parts of the consumer electronic products, electronic test equipments, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic device can include unfinished products.

One embodiment is a method including providing a plurality of phases of the same clock signal such that one or more of the phases being different from the other phases. The method further includes receiving electronic data comprising a data group including a plurality of pre-skewed data elements such that the data elements are received at two or more different points in time.

Another embodiment is an apparatus including a receiver circuit. The circuit includes a clock tree configured to provide a plurality of phases of the same clock signal such that one or more of the phases are different from the other phases. The circuit further includes a plurality of data input latches configured to receive a data group comprising a plurality of data elements such that the data elements are received at two or more different points in time.

Yet another embodiment is a system including a channel and a first component configured to transmit electronic data via the channel. The electronic data comprises a plurality of data groups. Each of the data groups comprises a plurality of data elements. The first component transmits the plurality of data elements at two or more points in time. The system further includes a second component configured to receive the electronic data via the channel. The second component is further configured to provide a plurality of phases of a first clock signal, and receive the plurality of data elements at least partially in response to the phases of the first clock signal.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

We claim:

1. An apparatus comprising a receiver circuit which comprises:
   a clock tree configured to provide a plurality of phases of the same clock signal such that one or more of the phases are different from the other phases;
   a plurality of data input latches configured to receive a data group comprising a plurality of data elements such that the data elements are received at two or more different points in time; and
   a group latch block, wherein the group latch block is configured to receive the data elements from the plurality of data input latches,
   wherein the clock tree comprises a linear line, wherein the linear line comprises a plurality of nodes from which the plurality of phases are provided,
   wherein the receiver circuit further comprises a plurality of data lines, each of the data lines being configured to transfer a respective one of the data elements from a respective one of the data input latches to the group latch block, wherein the plurality of data lines have a length different from one another such that one or more of the data elements experience different delays from the other data elements between the data input latches and the group latch block.

2. The apparatus of claim 1, wherein the plurality of nodes of the clock tree and the data lines are configured to allow the data elements to reach the group latch block at essentially the same time.

3. A system comprising:
   an interconnect;
   a first component configured to transmit electronic data via the interconnect, wherein the electronic data comprises a plurality of data groups, each of the data groups comprising a plurality of data elements, wherein the first component transmits the plurality of data elements at two or more points in time; and
   a second component configured to receive the electronic data via the interconnect, the second component being further configured to provide a plurality of phases of a first clock signal, and receive the plurality of data elements at least partially in response to the phases of the first clock signal,
   wherein the second component comprises a clock tree configured to provide a plurality of phases of the same clock signal such that one or more of the phases are different from the other phases, wherein the clock tree comprises one or more lines, each of which has one or more segments, each of the segments having a length that delays a phase of the clock signal carried by the segment by an amount corresponding to the length of the segment, wherein the plurality of phases are extracted from points associated with the segments, and
   wherein the second component further comprises a plurality of data lines, each of the data lines being configured to transfer a respective one of the data elements from a respective one of data input latches to a group latch block, wherein the plurality of data lines have a length different from one another such that one or more of the data elements experience different delays from the other data elements between the data input latches and the group latch block.

4. The system of claim 3, wherein the first component is configured to transmit the first clock signal to the second component via the interconnect.

5. The system of claim 3, wherein the second component is configured to extract the first clock signal from the electronic data received by the second component.

6. The system of claim 3, wherein the first component transmits each of the data elements at different points in time.

* * * * *